March 10, 1936.  B. D. MARSHALL  2,033,384
GEAR CUTTER
Filed Aug. 15, 1932  2 Sheets-Sheet 1

Inventor
Bertrand D. Marshall

By Blackmore, Spencer & Flint
Attorneys

March 10, 1936.  B. D. MARSHALL  2,033,384
GEAR CUTTER
Filed Aug. 15, 1932   2 Sheets-Sheet 2
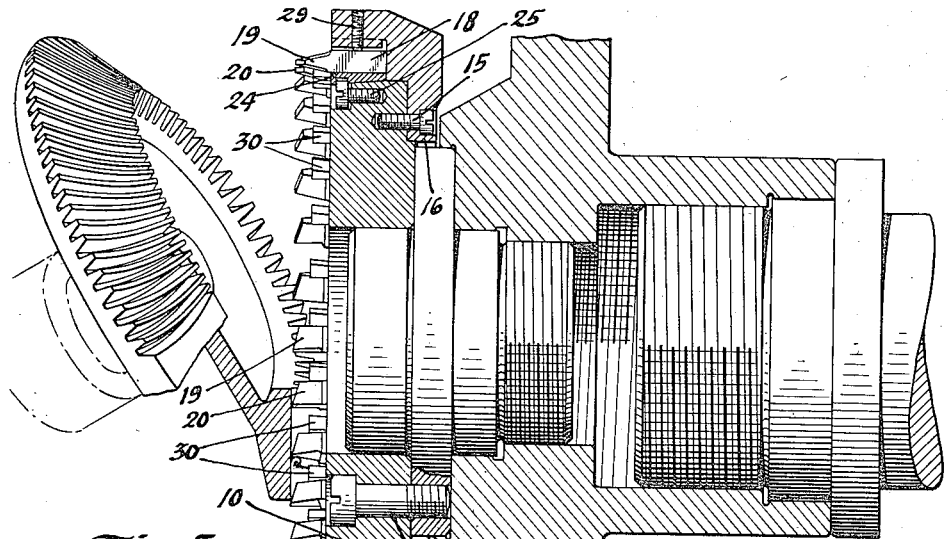
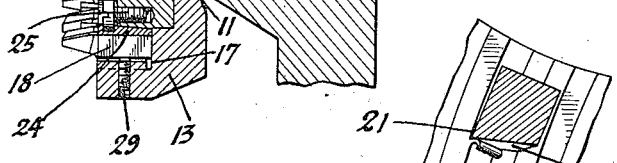
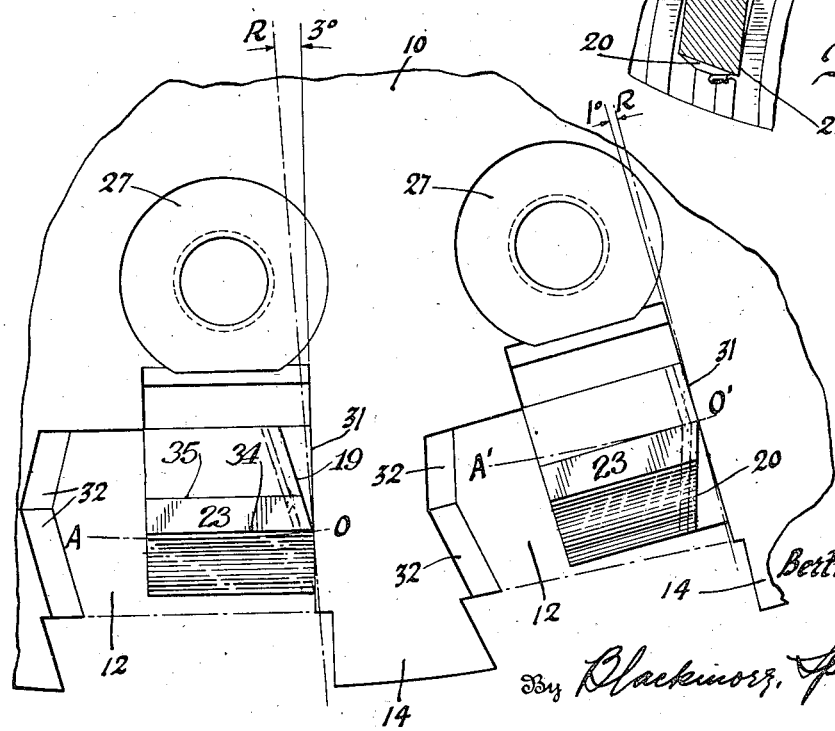

Patented Mar. 10, 1936

2,033,384

UNITED STATES PATENT OFFICE 2,033,384

GEAR CUTTER

Bertrand D. Marshall, Detroit, Mich., assignor to General Motors Corporation, Detroit, Mich., a corporation of Delaware Application August 15, 1932, Serial No. 628,800½

2 Claims. (Cl. 29—105)

My invention relates to devices for cutting gear teeth upon a suitable blank, and particularly to such devices as comprise a body or cutter carrier adapted to be secured to the rotating spindle of a machine designed to form gear teeth upon said blank, and which carrier is provided with a series of cutters separate therefrom and arranged upon its exposed face; and which cutters project from the carrier in the direction of the axis of rotation thereof and of the spindle; the device being designed to form teeth which are curved in the direction of their length, and are usually inclined relative to the axis of the blank and gear produced, these being characteristics of spiral bevel gears.

The objects of my invention are to provide a gear cutting device of the type above mentioned wherein a simple form of cutter, and one which may be sharpened repeatedly without changing its form or the form of the teeth produced, is used; to provide such a device with improved means for adjusting the cutters and for holding them in place more securely than has heretofore commonly been the case; to provide features of the body or cutter carrying part whereby greater strength than heretofore, with consequent ability to endure severe service, is secured; and to otherwise improve gear cutting devices of the kind or type to which my invention relates.

With the above and other objects in view my invention consists in the improved gear cutting device illustrated in the accompanying drawings and hereinafter described and claimed and in such variations and modifications thereof, within the scope of the concluding claims, as will be obvious to those skilled in the art to which my invention relates.

In the drawings, comprising two sheets:

Figures 2, 3, and 4 are drawn to a scale about twice that of Figure 1.

Figure 5 is a schematic view upon a somewhat smaller scale than Figure 1, illustrating the relationship of the gear cutting device to a spiral bevel gear being cut or formed thereby.

Figure 6 is a fragmentary view showing how alternate cutters cut upon their inner and outer advancing corners or edges, and upon the inner and outer sides of the groove between adjacent teeth of the gear being formed.

Figure 7 is a fragmentary view illustrating a detail of arrangement of the recesses in which the cutters are held.

Figure 1:
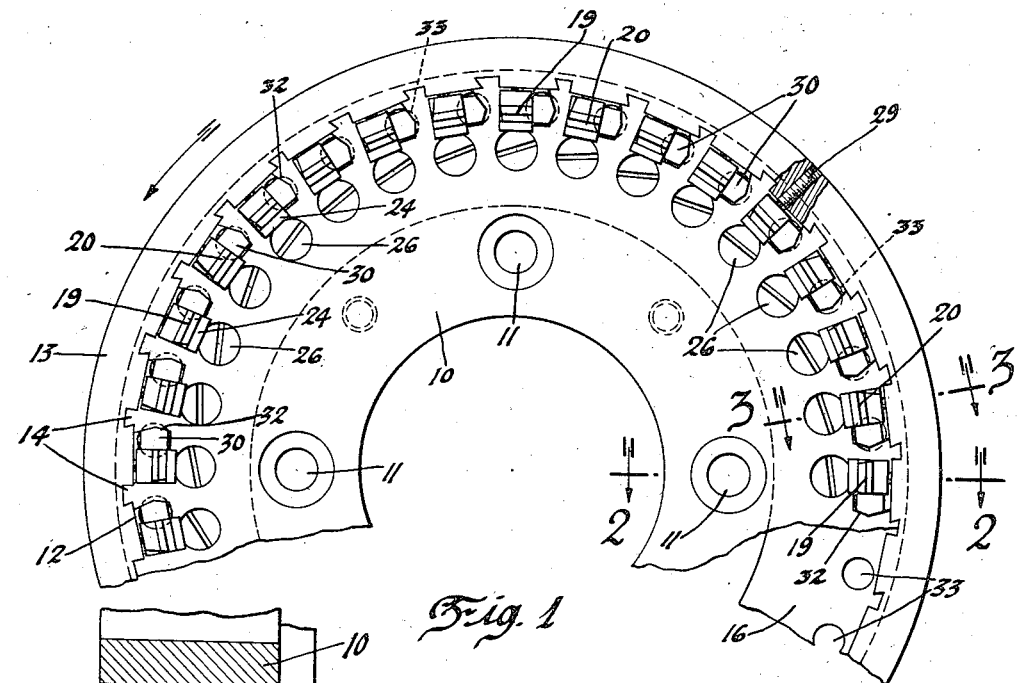
Figure 1 is a view showing my improved gear cutting device in elevation as seen looking toward the exposed face thereof, from which the cutters project, the lower part being broken away to provide room for other figures.
Figure 2:
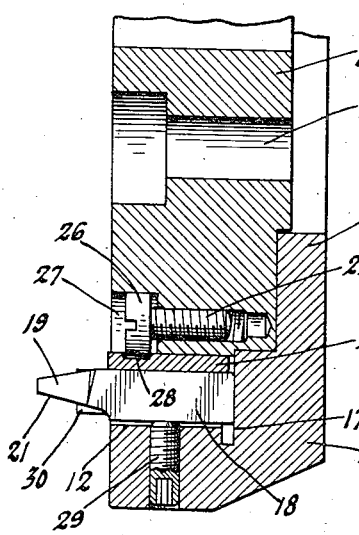
Figure 2 is a view showing a section upon a radial plane indicated by the line 2—2, Figure 1, the cutter shown being one which cuts upon the outer side of its projecting portion.

Referring now to the drawings, the reference numeral 10 designates a rotatable cutter carrying member or carrier whereby the cutters, thirty-two in number in the embodiment of my invention illustrated, are carried; and which carrier is adapted to be secured to the end of the rotating spindle of a gear cutting machine of any suitable type or kind as indicated conventionally in Figure 5. Various features of carrier for enabling it to be secured to the spindle may be used, the carrier illustrated being provided with holes 11 for holding bolts extending into a flange at the free end of such a spindle. The number of cutters may be varied although the number made use of is always comparatively great, as an important feature of my invention consists in the use of cutters sufficiently numerous that two or more are always operating at the same time upon the gear being produced, as indicated in Figures 5 and 6, whereby a much smoother operating and a more satisfactory gear cutting device is secured.

The carrier 10 is provided with a plurality of recesses 12 spaced about its periphery and within which the cutters, and the wedges which hold them in position, are housed; and the numeral 13 designates a ring member extending about the periphery of the carrier and over the open outer sides of the recesses. This ring is illustrated as interlocked with the periphery of the carrier by dovetailed connections 14 located between the recesses 12, and the same is secured to the carrier by a series of spaced screws 15 extending through an inwardly extending flange 16 thereof and into threaded holes in the rear face of the carrier. This ring has also an annular ledge 17 which forms a bottom wall for all of the recesses 12 and results in closed recesses for receiving the cutters and the wedges for holding them in place, and provides increased strength at the periphery of the device and a construction wherein the walls of the recesses between the cutters, which are comparatively thin because of the large number of cutters provided for, will be held against distortion as the wedges which hold the cutters in the recesses are forced into their holding positions. The recesses 12 being open at their outer sides, as well also as the dovetailed parts 14 for interlocking with the ring 13, may be formed by a shaper or equivalent machine tool having a reciprocating tool carrier, thus providing a device of the class herein contemplated wherein the recesses may be more conveniently provided for, than if they were formed in an integral supporting member; and provide a carrier for the cutters wherein when the ring is in place the support 10 and the ring provide cutter receiving recesses which have continuous peripheral walls surrounding the cutters, and wherein the two form in effect an integral single-piece structure for supporting the cutters.

Figure 4:
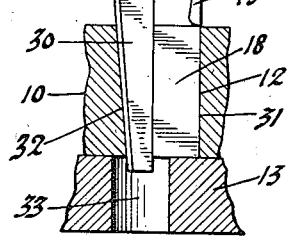
Figure 4 is a view looking up from the plane 4—4, Figure 3.
Figure 3:
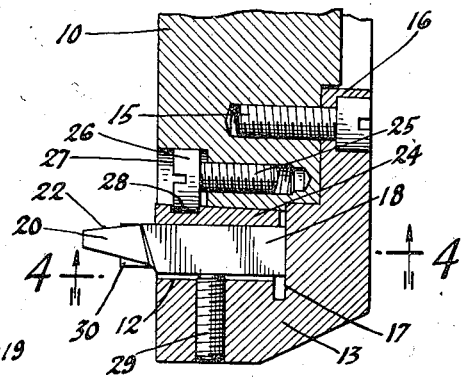
Figure 3 is similar to Figure 2 but is on the radial plane 3—3, Figure 1, and shows a cutter which cuts upon the inner side (toward the axis of rotation of the device) of its projecting part.

The cutters have square or rectangular base portions 18 which lie within the recesses 12 and abut against the ledge 17 of the ring 13, and outer tooth forming parts which extend from the outer exposed face of the carrier 10 in the direction of the axis of rotation thereof or, as otherwise expressed, substantially at right angles to the face of the carrier. These cutters are all alike except that their projecting parts are inclined or raked oppositely, as at 19 and 20, so that alternate cutters cut upon their outer and inner edges 21 and 22, respectively, as indicated in Figure 6. all the cutters are given the usual rake at their extremities, as shown at 23 in Figure 4.

The cutters are adjustable radially of the carrier 10 to determine the width of cut, or distance between adjacent faces of successive teeth formed by the device, by wedges 24 which may be moved in and out by screws 25 threaded into the carrier and the heads 26 of which move in recesses 27 in the carrier and the peripheries of which heads enter into recesses 28 in the wedges; and the cutters are held in place, after they have been properly adjusted by the wedges 24, by set screws 29 in threaded holes in the outer part of the ring 13 and the inner ends of which screws engage the cutters.

The radial positions of the cutters may be adjusted by the wedges 24 and set screws 29 and, after such positions have been determined, wedges 30 are driven into place behind the cutters to force them against the front or advancing walls 31 of the recesses 12, which wedges resist circumferential stresses when the device is in use. The advancing sides of these wedges are plane and abut against like surfaces of the inner parts 18 of the cutters, but the backs or following sides are V-shaped, and fit in correspondingly formed seats of the rear walls of the recesses 12, as indicated by the reference numeral 32. Holes 33 are provided in the ring 13 at the locality of the inner ends of the wedges 30, see Figure 4, so that they may be driven out when it becomes necessary to remove the cutters to sharpen or adjust them, sharpening being accomplished by grinding back the bevelled faces 19, 20 as is usual in cutters of the type wherein the form thereof is unaffected by sharpening and remains unchanged throughout their life.

The recesses 12 are so formed in the carrier 10 that their front or advancing walls 31 against which the inner parts 18 of the cutters lie, are inclined slightly relative to radial lines of the device. Thus in Figure 7 the line R is a radial line, and the plane of the advancing wall 31 of the left-hand recess 12 is inclined about 3° to the radial plane indicated by the line R. This left-hand recess contains a cutter which cuts upon its outer side 21, Figure 6; and the outer corner at the extremity thereof cuts, initially, at the point O, and if the cutter never needed to be sharpened the cutting action of this point would always be along the concentric curve OA.

It is necessary in cutters of all types that clearance be provided back of the cutting edge of the tooth, see Figure 6; and clearance may be provided by relieving the projecting part back of the cutting edge, by grinding the same to a definite and particular form, by positioning said part definitely relative to the shank of the tooth which ordinarily takes a predetermined position within a socket provided for it, or otherwise. When, however, the tooth as herein comprises a rectangular base 18 and a tapering tooth part the sides of which are plain, and the edges 34, 35 of which are parallel with the sides of the base, clearance is most conveniently provided by inclining the front walls 31 of the recesses within which the teeth are held, as above explained, to an extent sufficient, referring again to Figure 6, to secure proper clearance back of the cutting edges of the teeth. This is a simple form of tooth to produce as the projecting part is simply a truncated pyramid rising from a rectangular base, and is a form which may be produced and duplicated more cheaply than though the sides of the projecting part had to be ground to relieve them or had to be otherwise specially shaped to provide proper clearance when the tooth is in use.

The teeth, however, have to be sharpened regularly and, as explained, the sharpening is done by grinding back the inclined surfaces 19 and 20, as indicated by the inclined lines drawn on the tooth outline near the cutting points O and O' in Figure 7. This grinding, however, does not affect the groove formed by the cutters to any considerable degree and, as the gears are ordinarily finished to a more exact form of tooth after having been cut by the improved gear cutting device herein disclosed, the error present in the gear even before the finishing operation is quite negligible. In fact the inclining of the cutter recesses provides a gear cutting device wherein the cutters may be ground back from their cutting edges, which is ordinarily done without removing them from the carrier 10, as much as a quarter of the circumferential length of their projecting cutting ends before it is necessary, in order to preserve a requisite degree of accuracy in the gears cut, to readjust the cutters radially by the wedges 24 and set screws 29.

The above obviously applies in the same way to the right-hand recess 12 which contains a cutter which cuts upon its inside edge 22, Figure 6, and wherein the initial cutting is at the point O'; and wherein the concentric curve O'A' represents the wall of the groove between teeth initially, that is before the tooth is sharpened. As regards both teeth the grinding of course changes the width of the groove somewhat, but the errors thus introduced are extremely small and of no considerable consequence. The recess features disclosed permit the grinding of the cutters several times without adjusting them or removing them from the carrier and, after the cutters have been ground back for about one-fourth their length, circumferentially, they are ordinarily readjusted radially. This procedure will result in gears well within the limits of accuracy ordinarily required, and in gears which in fact vary one from another to no material degree.

Having thus described my invention and ex- plained the operation thereof, I claim and desire to secure by Letters Patent:

1. In a device of the class described, a rotatable carrier having a plurality of recesses extending inward from its periphery; a ring member extending about the periphery of said carrier and interlocked therewith by dovetailed joints located between said recesses, said ring member having an inwardly extending flange secured to the rear face of said carrier; and a plurality of cutters secured in place within said recesses, and which cutters extend laterally from the exposed face of said carrier.

2. In a device of the class described, a rotatable carrier having a plurality of recesses extending inward from its periphery; a ring member extending about the periphery of said carrier and interlocked therewith by dovetailed joints located between said recesses, said ring member having an annular ledge which forms a bottom wall for all said recesses, and an inwardly extending flange secured to the rear face of said carrier; and a plurality of cutters secured in place within said recesses and abutting against said annular ledge, and which cutters extend laterally from the exposed face of said carrier.

BERTRAND D. MARSHALL.